United States Patent
Suzuki

(10) Patent No.: US 6,256,520 B1
(45) Date of Patent: Jul. 3, 2001

(54) MOBILE COMMUNICATION DEVICE, POWER SUPPLY DEVICE AND POWER SUPPLY METHOD FOR THE MOBILE COMMUNICATION DEVICE, AND DATA TERMINAL CONNECTION MODEM CARD CONNECTABLE TO THE MOBILE COMMUNICATION DEVICE

(75) Inventor: Isao Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/045,787

(22) Filed: Mar. 23, 1998

(30) Foreign Application Priority Data

Mar. 24, 1997 (JP) .................................................. 9-069757

(51) Int. Cl.⁷ .................................................. H04Q 07/32
(52) U.S. Cl. ......................... 455/572; 455/571; 455/557; 455/343; 455/575
(58) Field of Search ..................... 455/575, 572, 455/574, 571, 557, 556, 344, 348, 349, 343, 127, 346; 370/473

(56) References Cited

U.S. PATENT DOCUMENTS

| 5,497,507 | * | 3/1996 | Komaki | 455/573 X |
| 5,751,719 | * | 5/1998 | Chen et al. | 370/473 |
| 5,778,325 | * | 7/1998 | Lindell et al. | 455/573 |
| 5,896,574 | * | 4/1999 | Bass, Sr. | 455/557 |

FOREIGN PATENT DOCUMENTS

| 2 286 732 | 8/1995 | (GB) . |
| 2 292 866 | 3/1996 | (GB) . |
| 2 311 179 | 9/1997 | (GB) . |
| 2 318 255 | 4/1998 | (GB) . |
| 5-22188 | 1/1993 | (JP) . |
| 6-268809 | 9/1994 | (JP) . |
| 8-101901 | 4/1996 | (JP) . |
| WO 96/21900 | 7/1996 | (WO) . |

OTHER PUBLICATIONS

Japanese Office Action dated Jun. 15, 1999, with partial translation.
British Search Report dated Sep. 30, 1998.

* cited by examiner

Primary Examiner—Fan Tsang
Assistant Examiner—Philip J. Sobutka
(74) Attorney, Agent, or Firm—McGinn & Gibb, PLLC

(57) ABSTRACT

When a control section 8 of a mobile communication device detects a voltage drop of a battery during wireless data communication through packet transmission, the control section temporarily stops transmission in the state where reception is maintained. The mobile communication device receives power from a data terminal connected to the mobile communication device through a modem card. When an exchange of batteries is ended and a battery voltage is recovered, transmission is resumed. Transmission data during a period when the transmission is stopped, is stored in a RAM in the modem card.

13 Claims, 5 Drawing Sheets

MOBILE COMMUNICATION DEVICE, POWER SUPPLY DEVICE AND POWER SUPPLY METHOD FOR THE MOBILE COMMUNICATION DEVICE, AND DATA TERMINAL CONNECTION MODEM CARD CONNECTABLE TO THE MOBILE COMMUNICATION DEVICE

BACKGROUND OF THE INVENTION

1. Field of the Invention

The present invention relates to a mobile communication device, and particularly to a power supply for a mobile communication device carrying out wireless data communication.

2. Description of the Related Art

Conventionally, in a mobile communication device such as a portable telephone and a car telephone, during communication to a base station, when a battery voltage becomes lower than a voltage necessary for the communication, the communication is cut off. Thus, after exchanging a battery, a user of the communication device must make operations again for connection of a communication line, such as a calling operation. Besides, since various kinds of information required for communication operations or for signal processing are stored in a RAM, they are lost at the exchange of the battery.

With regard to such a problem, for example, Japanese patent application Laid-open No. Hei. 5-22188 discloses a technique in which when a battery voltage is lowered, data stored in a RAM is stored in an EEPROM to protect the data.

FIG. 1 is a structural block diagram schematically showing a mobile communication device disclosed in the publication.

In FIG. 1, at the reception of a signal from a not-shown base station, the signal received through an antenna 51 is subjected to processing such as amplification and demodulation by a wireless section 52. Thereafter, the output of the wireless section is subjected to predetermined signal processing by a signal processing section 53 and is outputted as a voice from a speaker 54.

On the other hand, when a signal is transmitted to the base station, a line is connected by the operation of a key pad 60. Thereafter, a voice from a microphone 55 is subjected to predetermined signal processing by the signal processing section 53, and then, is subjected to processing of demodulation and amplification and is transmitted from the antenna 51.

A micro-computer (hereinafter referred to as a microcomputer) 56 is a circuit for controlling and processing these transmitting/receiving operations, and the information regarding the controlling or processing is stored in a RAM 57.

A battery 62 supplies power to the respective sections of the communication device, and the output voltage thereof is monitored by a voltage monitoring circuit 61. On the basis of the output of the voltage monitoring circuit 61, when the battery voltage becomes lower than a predetermined value, the microcomputer 56 stores the information stored in the RAM 57 into an EEPROM 58. In this way, the information is protected.

Thereafter, after an exchange of batteries is ended, the information stored in the EEPROM 58 is restored in the RAM 57, and on the basis of the information from the RAM 57, the microcomputer 56 makes setting of a transmission/reception channel, transmission/reception output level, and the like. That is, the state before the power was cut off is recovered. Then the operation of the device shifts to a communication operation.

On the other hand, in recent years, wireless communication of data from an information terminal such as a personal computer is carried out by using a mobile communication device. It is also possible to use the above described mobile communication device in this wireless data communication.

However, in the above described conventional mobile communication device, when a drop in battery voltage is detected, the information must be transmitted from the RAM to the EEPROM, and the information must be recovered from the EEPROM to the RAM after the exchange of batteries is ended.

On the other hand, even if the above described conventional mobile communication device is applied to the wireless data communication, data from the information terminal is lost by the voltage drop of the mobile communication device. Otherwise, it is necessary to interrupt the data communication by a communication application which has operated until now at the side of the information terminal. Thus, if the application at the side of the information terminal does not retransmit all the data lost during the interruption, data communication after resumption can not be realized. That is, the data communication which has been carried out by the communication application at the side of the information terminal comes to nothing, and the same data communication must be carried out again, so that finite radio frequencies are wasted, and also time is wasted.

SUMMARY OF THE INVENTION

An object of the present invention is to solve the above described problems and to provide an improved mobile communication device.

Another object of the present invention is to provide a power supply device for a mobile communication device and a power supply method by which a battery can be exchanged without cutting off the connection of wireless communication.

Still another object of the present invention is to provide a power supply device for a mobile communication device and a power supply method by which data communication can be continued without interrupting or terminating an application at the side of a data terminal so that it is not necessary to carry out wasteful wireless data communication following reconnection.

Still another object of the present invention is to provide an improved data terminal connection modem card which will be clarified later.

In order to achieve the above described objects, a mobile communication device according to the present invention which carries out wireless data communication to an external device, comprises a transmitting section for transmitting data to the external device, a battery for supplying power to the mobile communication device, an interface for receiving power from a data terminal having the data through a modem card connected to the mobile communication device, and a control section for making power supply from one of the battery and the interface.

The mobile communication device further comprises a detecting section for detecting a voltage of the battery, and a comparing section for comparing a detected voltage with a predetermined voltage value. It is preferable that the control section stops data transmission from the transmitting section when the detected voltage becomes lower than the predetermined voltage value.

It is preferable that the control section selects power supply from the interface when the detected voltage becomes lower than the predetermined voltage value.

The control section may resume data transmission from the transmitting section when the detected voltage becomes equal to or higher than the predetermined voltage value after the detected voltage became lower than the predetermined voltage value.

Also, in the present invention, in a modem card for connecting a mobile communication device carrying out wireless data communication to an external device, to a data terminal for transmitting data to the mobile communication device, the data is transmitted from the data terminal to the mobile communication device, and a power supply current supplied from the data terminal is fed to the mobile communication device.

Further, it is preferable that the modem card includes a memory for storing the data from the data terminal.

It is preferable that the modem card stores the data into the memory in response to a first control signal from the mobile communication device, and outputs the stored data to the mobile communication device in response to a second control signal from the mobile communication device.

Further, according to the present invention, a power supply device of a mobile communication device for carrying out wireless data communication to an external device, comprises a data terminal for transmitting data to the mobile communication device, and a modem card for connecting the data terminal to the mobile communication device so as to supply the data to the mobile communication device, and the mobile communication device receives power from the data terminal having the data through the modem card.

Further, it is preferable that the mobile communication device can be supplied with power from a battery, and comprises a detecting section for detecting a voltage of the battery, and a comparing section for comparing the detected voltage with a predetermined voltage value, and when the detected voltage becomes lower than the predetermined voltage value, the mobile communication device stops data transmission and receives power from the modem card.

Still further, in the present invention, in a power supply method for a mobile communication device of a system including the mobile communication device for carrying out wireless data communication to an external device, a data terminal for transmitting data to the mobile communication device, and a modem card for connecting the data terminal to the mobile communication device so as to supply the data to the mobile communication device, the mobile communication device is supplied with power from the data terminal having the data through the modem card.

Further, it is preferable that the mobile communication device can be supplied with power from a battery, and when a voltage of the battery becomes lower than a predetermined voltage value, the mobile communication device stops data transmission and receives power from the modem card.

As described above, according to the present invention, in the case where a voltage of a battery of a mobile communication device is lowered, when wireless communication is carried out, the mobile communication device stops a transmission function, decreases a consumed current, and receives power from a data terminal. When a battery voltage is recovered by an exchange of batteries or the like, transmission is resumed. Accordingly, even if a battery voltage is lowered, a receiving operation is continued, so that the exchange of batteries can be made without cutting off the wireless communication.

BRIEF DESCRIPTION OF THE DRAWINGS

These and other objects, features and advantages of this invention will become more fully apparent from the following detailed description taken with the accompanying drawings in which.

Figure 1:
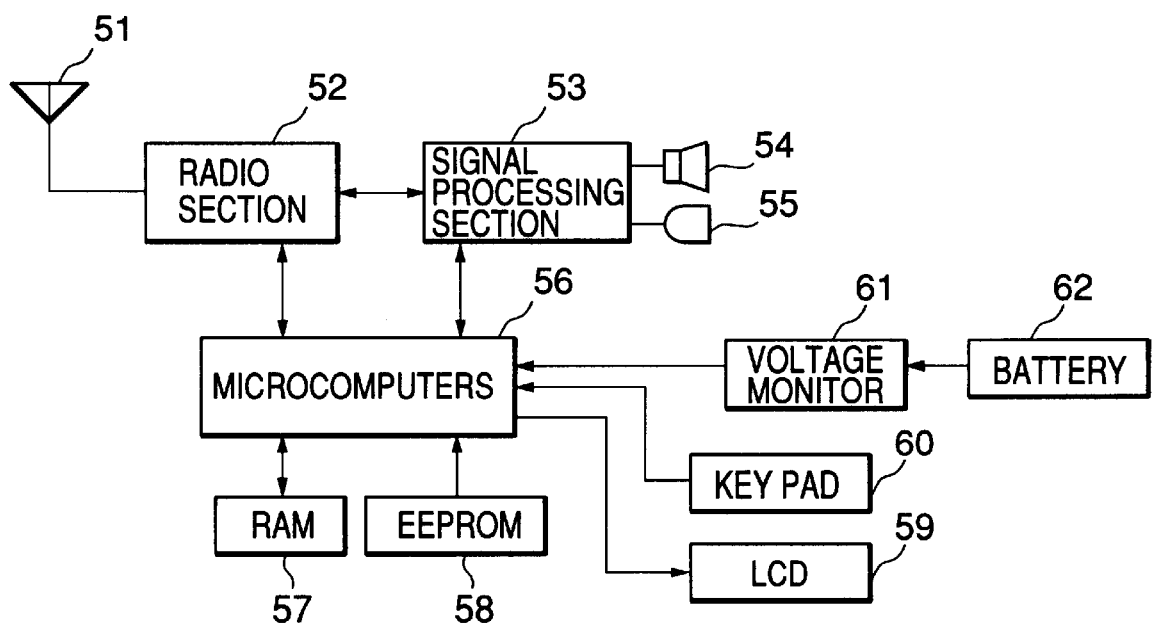
FIG. 1 is a structural block diagram showing a conventional mobile communication device.

In the drawings, the same feference numerals denote the same structural elements.

DESCRIPTION OF THE PREFERRED EMBODIMENTS

Preferred embodiments of the present invention will be described below with reference to the drawings.

Figure 2:
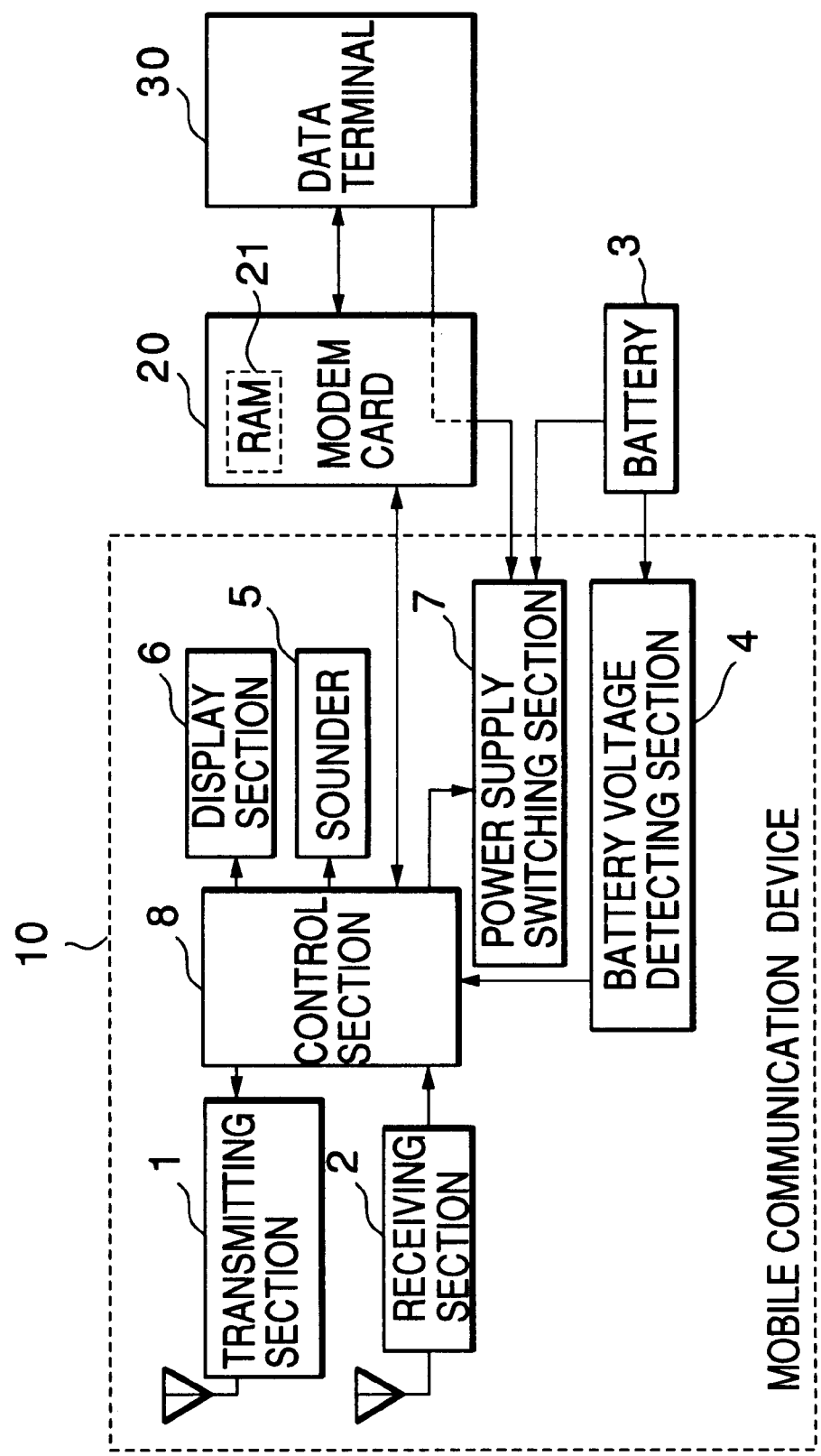
FIG. 2 is a structural block diagram showing an embodiment of this invention.

FIG. 2 is a structural block diagram showing an embodiment of a wireless data communication device according to the present invention.

In FIG. 2, the wireless data communication device is constituted by a mobile radio communication device 10, a modem card 20, and a data terminal 30. The mobile radio communication device 10 is preferably a car telephone, a portable telephone, or a second generation cordless telephone. The mobile radio communication device may be a two-way communication type pager. The modem card 20 is preferably a data terminal connection modem card. The data terminal 30 is preferably a personal computer or a portable information terminal. However, the present invention is not limited to these, but any device is used as the mobile communication device 10 as long as the device can be wireless-connected to a base station and can carry out data communication. Also, any device is used as the data terminal 30 as long as the device stores data and can transmit the data, and any device can be used as the modem card 20 as long as the device enables data transmission between the mobile communication device 10 and the data terminal 30.

The mobile communication device 10 is preferably connected to the modem card 20 through a communication cable, and the data terminal 30 and the modem card 20 are preferably connected to each other through a PCMCIA type connector. However, these connections are not limited to this embodiment, but other connecting method may be adopted.

The mobile communication device 10 includes a transmitting section 1 for transmitting radio signals of coded data through a specific channel by an antenna to a not-shown external device, for example, a base station, and a receiving section 2 for receiving coded data from the base station through the specific channel by the antenna. It is preferable that wireless data communication between the base station and the mobile communication device 10 is carried out through packet transmission.

It is to be noted that, in FIG. 2, although the antenna is shown for each of the transmission side and the receiving side, it is apparent that one antenna can be used for both transmission and reception in the field of a wireless communication technique.

A battery 3 supplies power to the mobile communication device 10, and may be integrated in the mobile communication device 10 or may be detachably connected to the mobile communication device 10. That is, it is sufficient if only the battery can be exchanged for another when a battery voltage is lowered.

In the inside of the mobile communication device 10, a battery voltage detecting section 4 detects a voltage of the battery 3, and supplies the detected voltage information to a control section 8. Although it is preferable to always detect the voltage, the detection may be carried out at a constant time interval. A sounder 5 and a display section 6 give an alarm when a battery voltage is lowered, and generate an alarm sound for notifying a user of the battery exchange time and makes a display for urging the user to exchange a battery, respectively. It is possible that the sounder 5 and the display section 6 serve also as a calling sound generating section and a display section of telephone numbers and the like, which are equipped in a general mobile communication device.

A power supply switching section 7 switches a power source current from the battery 3 and a power source current from the data terminal 30 through the modem card 20, and supplies the current to the respective sections of the mobile communication device 10.

A control section 8 controls the respective sections of the mobile communication device 10, and as described later in detail, when a battery voltage from the battery 3 becomes lower than a predetermined value, the control section 8 stops a transmission function, causes the sounder 5 and/or the display section 6 to generate an alarm, and makes control so that the power from the data terminal 30 is supplied to the respective sections of the mobile communication device 10 through the modem card 20. Further, the control section 8 carries out data communication to the modem card 20.

Preferably, the predetermined value is a voltage at which a battery must be exchanged, or a minimum voltage at which the mobile communication device can operate. The predetermined value may be a minimum voltage required for transmission of data.

The modem card 20 is operated by receiving power from the data terminal 30, and supplies the power source current as well as data to the mobile communication device 10. That the modem card 20 is operated by receiving power from the data terminal 30 is similar to a conventional device. In the present invention, as shown by a wavy line in the inside of the modem card 20, the current supplied from the data terminal 30 is also supplied to the power source switching section 7 of the mobile communication device 10 through the modem card 20. It is preferable that the power from the data terminal is supplied through at least one terminal of a PCMCIA type connector, preferably through a preliminary terminal which is not used for data communication. Also, it is preferable that the power supply from the modem card 20 to the mobile communication device 10 is carried out while being superimposed on a signal in the communication cable.

The modem card 20 has a built-in memory for storing data from the data terminal 30, preferably a RAM 21, and when transmission is stopped in the mobile communication device 10, data from the data terminal 30 is stored in the RAM. After the transmission is restarted, the modem card 20 transmits the data stored in the RAM to the mobile communication device 10. This storing and transmitting is preferably carried out by a control signal from the control section 8. The reception data may be directly supplied to the data terminal 30 through the modem card 20 from the control section 8, or may be stored in the modem card 20 like the transmission data. However, when the capacity of the RAM is taken into consideration, the former is preferable.

As described above, in the present invention, data from the data terminal 30 is supplied to the mobile communication device 10 through the modem card 20, and the mobile communication device 10 transmits the data through wireless communication. If a voltage of the battery 3 becomes lower than an operable voltage of the mobile communication device 10 during data transmission, the transmission is stopped while a receiving operation is maintained, and the mobile communication device is supplied with power from the data terminal. During that, the modem card 20 stores the data from the data terminal 30. After the completion of the exchange of batteries, power is again supplied from the battery, and t he transmission is resumed.

The data received at the receiving section 2 is transmitted to the data terminal 30 from the control section 8 through the modem card 20.

Incidentally, since a power source current supplied to the modem card from the data terminal can not cover a consumed current of the mobile communication device during wireless communication, the transmission is temporarily stopped. Thus, if a current supplied from the data terminal to the modem card is so sufficient that the mobile communication device can carry out the transmission operation, it is not necessary to stop the transmission.

Further, although a conventional modem card receives power from a data terminal, it can not output the power to another device. Thus, in the present invention, the modem card is made to have a function to supply power in addition to data. Preferably, a power source current is supplied through the communication cable for connecting the modem card 20 to the mobile communication device 10. At present, although the communication cable has about 16 signal lines, about 8 or 9 signal lines are actually used for the data communication, and other signal lines are not used. Then, in the present invention, the remaining signal lines are preferably used to supply the power source current received from the data terminal 30 to the mobile communication device 10. The modem card 20 is provided with a path (passage) therefor.

Next, the operation of the present invention will be described in detail with reference to the flow charts shown in FIGS. 3 and 4.

Figure 3:
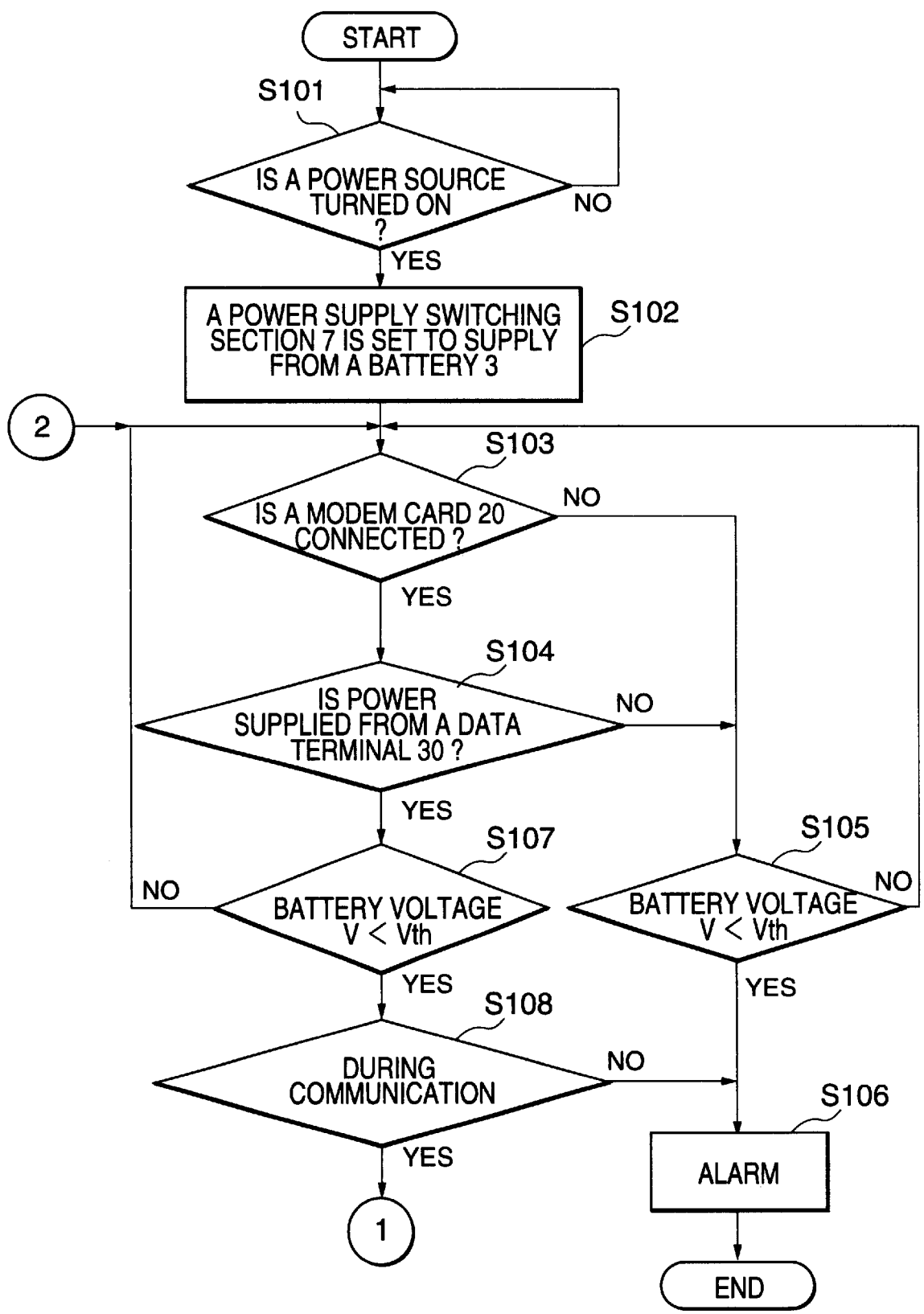
FIGS. 3 and 4 are flow charts showing an operation of an embodiment of a control section shown in FIG. 2.

In FIG. 3, when a power source is turned on by the operation of a not-shown power source switch or the like of the mobile communication device 10 (step S101), the control section 8 sets the power supply switching section 7 to power supply from the battery 3 (step S102). That is, between a power source current supplied from the data terminal 30 through the modem card 20 and a power source current from the battery 3, the power source current from the battery 3 is supplied to the respective sections in the mobile communication device 10.

Next, the control section 8 judges whether or not the modem card 20 is connected to the mobile communication device 10 (step S103), and if the modem card is connected, the control section judges whether or not the power source current is supplied to the power supply switching section 7 from the data terminal 30 through the modem card 20 (step S104). It is preferable that this judgement is carried out by start-stop system serial communication.

In the case where it is judged in step S103 that the modem card 20 is not connected, or in the case where it is judged that power supply from the data terminal 30 is not carried out though the modem card 20 is connected in step S104, if a voltage V of the battery 3 becomes lower than a predetermined voltage Vth (step S105), both or one of the sounder 5 and the display section 6 gives an alarm to a user (step S106).

On the other hand, in the case where it is judged in step S104 that current is supplied from the data terminal 30 through the modem card 20, if the battery voltage V becomes lower than the predetermined voltage Vth (step S107), the control section 8 judges whether or not communication is being carried out (step S108). If communication is not carried out, an alarm is given in step S106, and if communication is carried out, the operation proceeds to a process shown in FIG. 4.

Incidentally, the comparison between the battery voltage and the predetermined voltage value in the steps S105 and S107 is a judgement as to whether or not the battery voltage is sufficient to enable the mobile communication device to operate, and especially, it is preferable that the comparison is a judgement as to whether or not the battery voltage is sufficient to enable the mobile communication device to execute a transmission function.

Further, the wireless data communication between the not-shown base station and the mobile communication device 10 is carried out by transmission and reception of radio signals using the transmitting section 1 and the receiving section 2. In the case where there is data desired to be transmitted to the base station, the control section 8 inputs the data from the data terminal 30 through the modem card 20, and execute the packet transmission to the base station by using the transmitting section 1. On the other hand, after wireless data from the base station is demodulated by the receiving section 2, the data is transmitted to the modem card 20 from the control section 8. The modem card 20 sends the data to the data terminal 30.

The packet transmission is as follows: when data signals to be transmitted are generated, wireless communication is carried out to the base station by the length of the transmission data and the data is transmitted, or only data to a mobile communication device used by a user is received. In the packet transmission, it is also possible for a plurality of users to carry out wireless communication through one radio frequency. Thus, the control section 8 divides a data signal from the modem card 20 so that it can be transmitted to the base station by wireless communication, converts the divided data signal, and controls the transmitting section 1 so that wireless communication is carried out during a period corresponding to only the data signal. Moreover, the control section 8 controls so that data signal from the base station is received by the receiving section 2, only data to the own device is combined and converted, and the data is transmitted to the modem card 20.

In FIG. 3, although the comparison of the battery voltage is carried out after the judgement of connection of the modem card and the judgement of power supply from the data terminal, the comparison of the battery voltage may be carried out after setting of the power supply switching section, and in the case where the battery voltage is lower than a reference voltage, both or one of the judgement of connection of the modem card and the judgement of power supply from the data terminal may be carried out.

Figure 4:
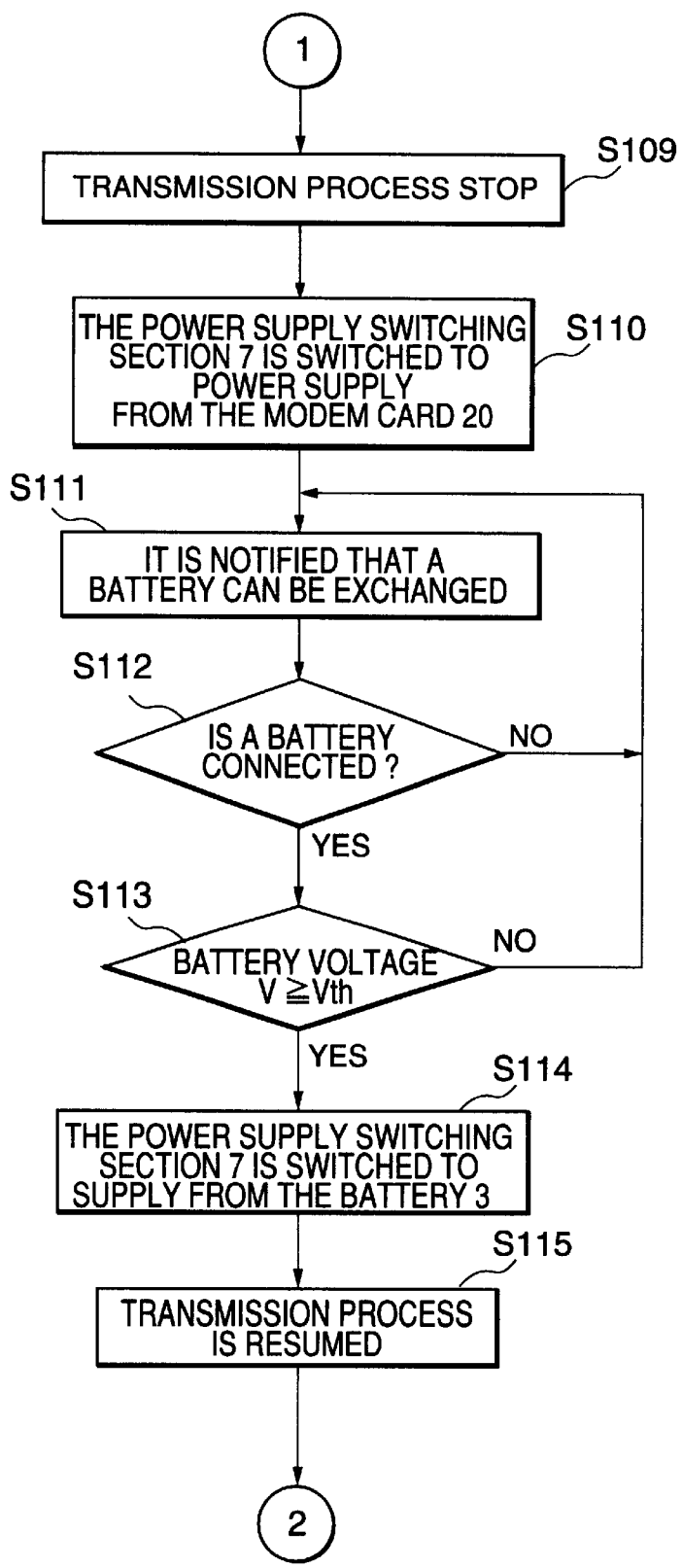

In FIG. 4, in the case where communication is being carried out, the control section 8 controls the transmitting section 1 to stop wireless data transmission (step S109). It is preferable that this control is carried out by sending a communication busy signal to the base station. That is, it is preferable that the control section 8 controls so that the transmitting section 1 sends the communication busy signal. The communication busy signal is, for example, an RNR signal in a communication protocol, or a signal in a LAPDM protocol regulated by RCR-STD27 in a digital portable telephone.

It is to be noted that the control section 8 does not send transmission data to the transmitting section 1 after sending the communication busy signal. By stopping the transmission process in this way, it is possible to decrease a current consumed by the mobile communication device 10 to about 10%. Also, it is possible to decrease a consumed current to a value lower than a current level (generally about 400 mA) in the range of a current supplied from the data terminal 30 through the modem card 20.

Subsequently, the control section 8 switches the power supply switching section 7 so that the power source current from the data terminal 30 can be supplied through the modem card 20 (step S110).

Further, the control section 8 sends a control signal to the modem card 20 so that data from the data terminal 30 is stored in the RAM. In response to the control signal, the modem card 20 stores the data in the RAM.

After the switching of the power supply switching section 7 is ended, the control section 8 visually notifies a user through the display section 6 that the exchange of the battery 3 is possible (step S111). At this time, the control section 8 may acoustically notify the user that the exchange of the battery is possible, by making the sounder 5 give an alarm sound. Incidentally, it is sufficient to use only the sounder 5 without using the display section 6.

The control section 8 monitors whether or not the battery 3 is taken out of the mobile communication device 10 on the basis of the detection result from the battery voltage detecting section 4 (step S112), and urges the exchange of the battery until the battery 3 is taken out.

On the other hand, when the battery 3 is taken out and a new battery is connected, the control section 8 judges whether or not the battery has a voltage required to carry out wireless data communication (step S113). In the case where the new battery does not have a required voltage, the control section urges a user to exchange the battery in the process of step S111, and in the case where the battery has a required voltage, the power supply switching section 7 is switched to power supply from the battery 3 (step S114).

Subsequently, the control section 8 controls the transmitting section 1 to resume the temporarily stopped wireless data transmission process (step S115). It is preferable that this control is carried out by sending a communication permitting signal from the transmitting section 1 to the base station. The communication permitting signal is, for example, an RR signal on the communication protocol, or a signal in the LAPDM protocol regulated by RCR-STD in a digital portable telephone.

Further, the control section 8 inputs the data stored in the RAM from the modem card 20 before the resumption of communication, at the same time as the resumption of communication, or after the resumption.

Although the battery voltage is always detected after a power source is turned on in the above described embodiment, the present invention is not limited to this, but detection may be carried out only during the communication.

Figure 5:
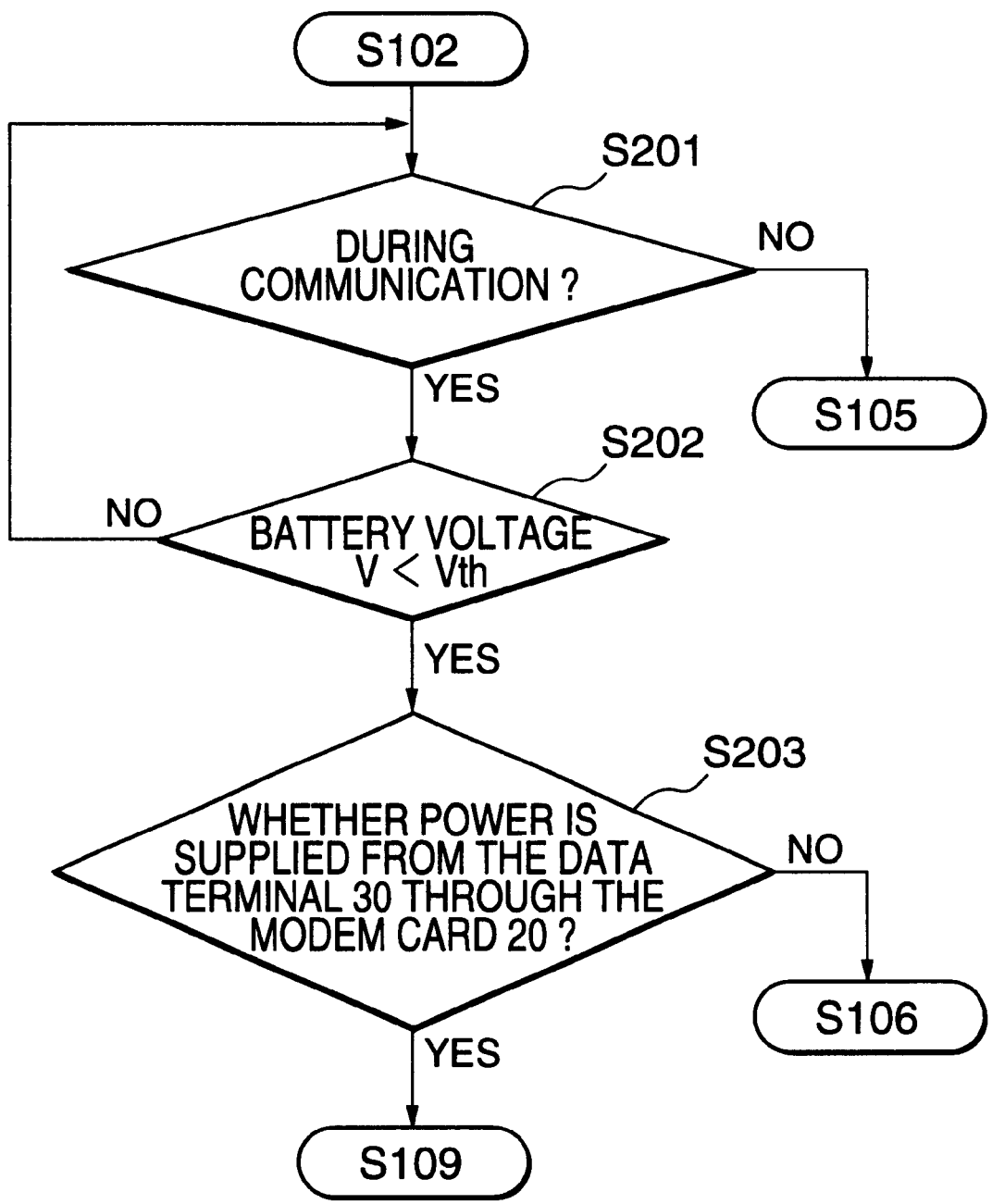
FIG. 5 is a flow chart showing an operation of another embodiment of the control section shown in FIG. 2.

In FIG. 5, after the process of step S102 in FIG. 3 is ended, the control section 8 judges whether or not wireless data communication is being carried out (step S201). If the communication is not carried out, the operation proceeds to step S105 shown in FIG. 3, and on the other hand, if the communication is carried out, it is judged whether or not the battery voltage V is lower than the reference value Vth (step S202).

In the case where the battery voltage V becomes lower than the reference value Vth, the control section 8 judges whether or not power supply from the data terminal 30 through the modem card 20 is carried out to the power supply switching section 7 (step S203). If power supply from the modem card 20 is not carried out, the operation proceeds to the process of step S106 shown in FIG. 3, and on the other hand, if there is power supply, the operation proceeds to the process of step S109 shown in FIG. 4.

As described above, according to the present invention, when a battery is exchanged, data transmission of a mobile communication device is restricted, and a consumed current is cut down, so that power supply from a data terminal is made possible. Thus, even in a mobile communication device which can not carry out wireless data communication for a long time, a battery can be exchanged without interrupting the wireless data communication.

Further, since the wireless data communication is not interrupted, it is not necessary to terminate a communication application at the side of the data terminal, too. Thus, it is not necessary to carry out the data transmission from the start.

Further, since it is riot necessary to carry out the data transmission again, it becomes possible to effectively use the radio frequency.

While the invention has been described with reference to specific embodiments thereof, it will be appreciated by those skilled in the art that numerous variations, modifications, and embodiments are possible, and accordingly, all such variations, modifications, and embodiments are to be regarded as being within the spirit and scope of the invention.

What is claimed is:

1. A mobile communication device, comprising:
   a transmitting section for transmitting transmission data;
   a receiving section for receiving reception data;
   a battery for supplying first power to said mobile communication device;
   a power supply section for supplying second power from a data terminal to said mobile communication device, the data terminal supplying the transmission data to the mobile communication device;
   a detecting section for detecting voltage of said battery to output a detected voltage; and
   a control section for reducing a consumed current of the mobile communication device, and for making said power supply section supply the second power from the data terminal to the mobile communication device, when the detected voltage is lower than a predetermined value.

2. A mobile communication device as claimed in claim 1, wherein said control section stops a transmitting operation by said transmitting section while maintaining a receiving operation by said receiving section, whereby reducing the consumed current of said mobile communication device.

3. A mobile communication device as claimed in claim 1, further comprising an alarm unit for giving an alarm when the detected voltage is lower than the predetermined value.

4. A mobile communication device as claimed in claim 1, further comprising a display section for giving an alarm when the detected voltage is lower than the predetermined value.

5. A mobile communication device as claimed in claim 1, wherein said battery is exchanged, when said power supply section supplies the second power to the mobile communication device.

6. A mobile communication device as claimed in claim 5, further comprising an alarm for acoustically notifying a user of a battery exchange time, wherein said battery is exchanged, when the detected voltage is lower than the predetermined value.

7. A mobile communication device as claimed in claim 5, further comprising a display section for visually notifying a user of a battery exchange time, wherein said battery is exchanged, when the detected voltage is lower than the predetermined value.

8. A power supply device of a mobile communication device for carrying out wireless data communication to an external device, comprising:
   a data terminal for supplying transmission data to the mobile communication device; and
   a modem unit for connecting said data terminal to the mobile communication device to supply the transmission data to the mobile communication device,
   wherein the mobile communication device receives power from said data terminal through said modem unit when a consumed current of the mobile communication device is reduced.

9. A power supply device as claimed in claim 8, wherein the mobile communication device stops a transmitting operation while maintaining a receiving operation, whereby reducing the consumed current of the mobile communication device.

10. A power supply device as claimed in claim 8, wherein said modem unit comprises a storage section for storing the transmission data from said data terminal when a transmission operation of the mobile communication device stops and the mobile communication device receives the power from said data terminal through said modem unit.

11. A power supply method for a mobile communication device of a system including the mobile communication device for carrying out wireless data communication to an external device, a data terminal for supplying transmission data to the mobile communication device, and a modem unit for connecting the data terminal to the mobile communication device to supply the transmission data to the mobile communication device, the power supply method comprising:
   reducing a consumed current of the mobile communication device; and
   supplying power from the data terminal to the mobile communication device through said modem unit, when the consumed current is reduced.

12. A power supply method as claimed in claim 11, further comprising:
   stopping a transmitting operation of the mobile communication device while maintaining a receiving operation of the mobile communication device, whereby reducing the consumed current of the mobile communication device.

13. A power supply method as claimed in claim 11, further comprising:
   storing the transmission data supplied from the data terminal in said modem unit.

* * * * *